(No Model.)
F. M. ROOTS.
JOURNAL BOX.
No. 349,361. Patented Sept. 21, 1886.
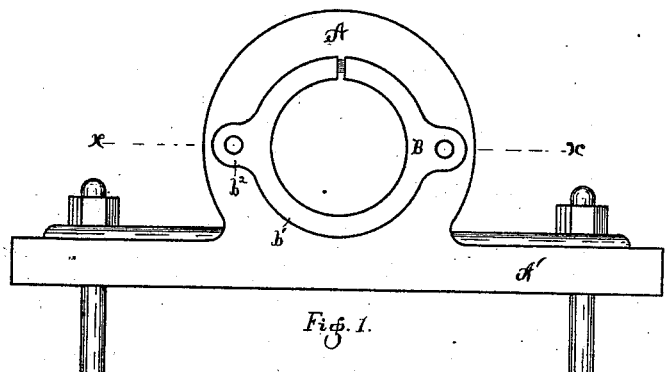
Fig. 1.
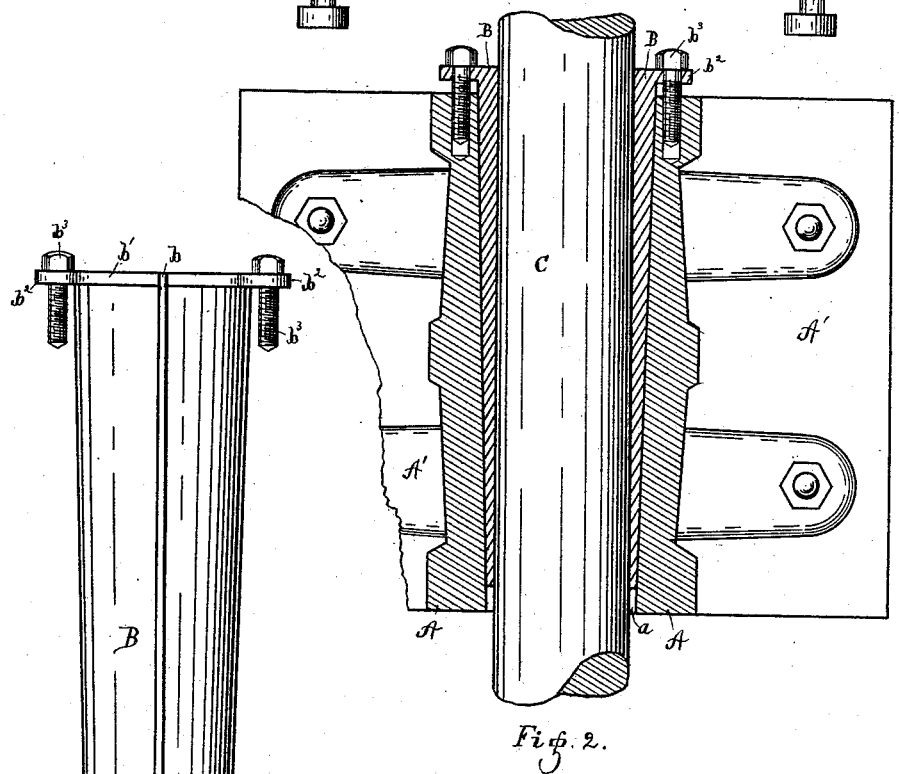
Fig. 2.
Fig. 3.
Attest.
C. W. Miles
Horace W. Males
Inventor.
Francis M. Roots
By Geo. F. Murray
his Atty

UNITED STATES PATENT OFFICE.

FRANCIS M. ROOTS, OF CONNERSVILLE, INDIANA.

JOURNAL-BOX.

SPECIFICATION forming part of Letters Patent No. 349,361, dated September 21, 1886.

Application filed January 19, 1886. Serial No. 189,057. (No model.)

*To all whom it may concern:*

Be it known that I, FRANCIS M. ROOTS, a citizen of the United States, and a resident of Connersville, in the county of Fayette and State of Indiana, have invented certain new and useful Improvements in Journal-Boxes, of which the following is a specification.

The object of this invention is to construct an improved journal-box and bearing for the journal so combined together that the journal may be always truly in line, and the wear resulting from its use may be readily taken up equally all around, so that the journal is always kept in its true position.

The invention consists in a box, which is usually cast in one piece, having a hole bored in the center to receive the bearing, the hole and exterior of the bearing being tapering from end to end and at an angle to the axis and parallel to each other, one end of the bearing having lugs projecting from it to receive bolts which are tapped into the end of the box, the bearing being longitudinally slotted to permit it to be forced into the box by the screws.

In the accompanying drawings, forming a part of this specification, in which like parts are represented by similar reference-letters wherever they occur throughout the various views, Figure 1 is an end elevation of my improved box and bearing and the table or plate and screw-bolts by which the same is secured upon the table or frame. Fig. 2 is a longitudinal central section taken through line $x\ x$ of Fig. 1. Fig. 3 is a longitudinal elevation of the bearing removed from the box.

The box A, which is preferably cast in one piece with the plate A', has the tapered opening $a$ cored out in casting, after which it is bored or reamed true on the inside to receive the slotted tubular journal-bearing B, which may be made of any suitable anti-friction metal. It is bored true through the center to receive a journal, C, and turned upon the outside to the same taper as the hole $a$ in the journal-box. Both the opening in the box and the sleeve should have a taper of from one-half to three-fourths of an inch to the foot for ordinary purposes; but the taper may be varied, depending upon the use for which the bearing is intended. After the bearing B is turned on the outside and bored true in the center it is slotted longitudinally at $b$, the width of the slot being about equal to the difference between the smaller and larger diameter at the opposite ends of the bearing B. Around the larger end of the bearing B is a flange, $b'$, which has lugs $b^2$ projecting from it upon opposite sides. These lugs are perforated to receive screw-bolts $b^3$, which pass through them, the screws being tapped into the end of the box A. The holes for the bolts $b^3$ should be a little larger than the bolts, so as to permit the bearing B to contract as the screws are tightened in to force the bearing farther into its box when the journal shall become loose from wear.

I am aware it is not new to employ two-part tapering collars, two of which are used—one at each end of the box—each section being provided with lugs and screws, by means of which the sections are adjusted back and forth, and that a slotted tapering sleeve, which is drawn upon by a nut upon its screw-threaded end to tighten the bearing, has been used, and hence do not claim these.

What I claim as new is—

The combination, substantially as specified, of the box A, having a bore tapering from end to end to receive the bearing-sleeve B, the sleeve B tapering upon the outside to correspond with the bore in the box, and having a longitudinal slot, $b$, lugs $b^2$, and screws $b^3$, passing through said lugs and tapped into the end of the box to tighten the bearing upon the journal.

FRANCIS M. ROOTS.

Witnesses:
 GEO. J. MURRAY,
 EDGAR O'HAIR.